E. L. EVANS.
Curry Comb.

No. 19,188.

Patented Jan. 26, 1858.

UNITED STATES PATENT OFFICE.

E. L. EVANS, OF PROVIDENCE, RHODE ISLAND.

CURRYCOMB.

Specification of Letters Patent No. 19,188, dated January 26, 1858.

*To all whom it may concern:*

Be it known that I, E. L. EVANS, of Providence, in the county of Providence and State of Rhode Island, have invented a new and useful Improvement in Currycombs; and I do hereby declare that the following is a full, clear, and exact description of the same, reference being had to the annexed drawing, making a part of this specification, in which—

Figure 1:
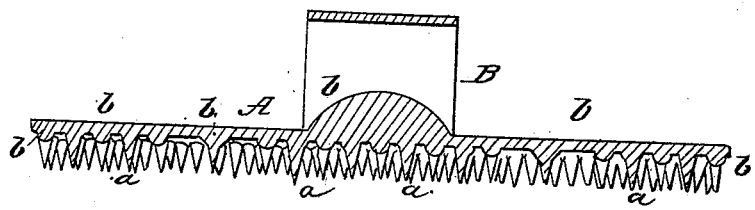
Figure 2:
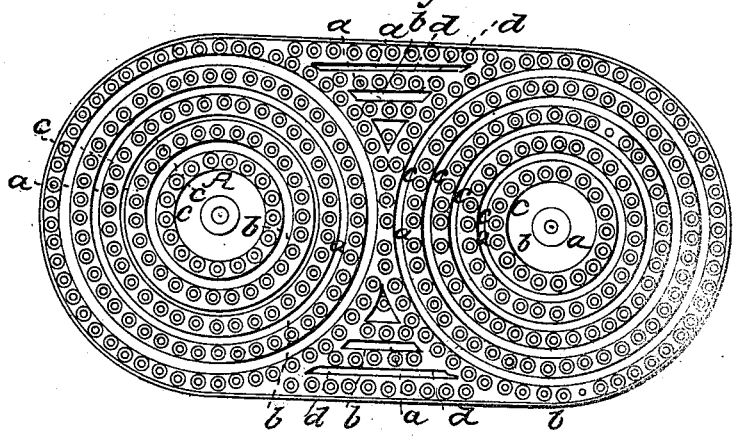

Figure 1, is a longitudinal vertical and central section of my improvement. Fig. 2, is a face view of ditto.

Similar letters of reference indicate corresponding parts in the two figures.

This invention relates to an improvement in curry combs for which Letters Patent were granted to me bearing date the 25th day of November 1856. The curry combs above alluded to were formed of india rubber backs and had metallic teeth secured in them in a peculiar manner, viz., by means of ridges and cones of the same substance as the backs and projecting from the backs so as to encompass and firmly support the teeth and prevent them from being casually detached.

In this invention the improvement consists in forming the teeth (which are connected to india rubber backs) entirely of india rubber or other similar or pliable substance so that the back is not only rendered flexible but the teeth also, and the comb thereby rendered much more efficacious than formerly.

To enable those skilled in the art to fully understand and construct my invention I will proceed to describe it.

A, represents the back of the curry comb which is constructed of india rubber. This back may be of any proper form and size, but a form as shown in Fig. 2, having parallel sides or edges and rounded ends would perhaps be preferable. The back is made sufficiently thick to insure durability and still be sufficiently flexible to readily conform to the inequalities of the surface over which it is passed.

The teeth (*a*) of the comb project down from the face side of the back A, and are of inverted conical or taper form. These teeth may be formed of the same material as the back, viz., india rubber, or they may be formed of some other substance possessing a certain degree of flexibility, such as gutta percha for instance. The comb is cast in a mold of proper form and in case the teeth are formed of india rubber the same material as the back A, the mold is filled at once with the material which is softened or rendered plastic in the usual way, but if a different pliable substance is used for the teeth, the latter substance must first be placed in the mold so that the openings which form the teeth may be filled by it, and the india rubber which forms the back placed over it, it being understood that if india rubber is not used for the teeth, a substance capable of being rendered plastic by heat as well as being flexible when cold, similar to india rubber, will be employed in all cases for the teeth.

The teeth (*a*) may project directly from thet back A, but I prefer having them project from ridges (*b*) formed on the face side of the back. These ridges transversely are of semi-circular or an approximate form as shown plainly in Fig. 1. The teeth (*a*) may be formed or disposed in concentric rings (*c*) on the face side of the back and connected by parallel rows (*d*) as shown in Fig. 2, or they may be otherwise disposed or arranged.

I would remark that a handle or loop B, is attached to the back A, said handle or loop being of india rubber.

By this improvement the comb is allowed to bend so as to readily conform to the surface of the body of the animal over which it is passed or rubbed in the usual way, and the teeth (*a*) will yield or give so as to thoroughly cleanse the skin and fur or hair, without in the least injuring or irritating the skin.

I do not claim separately the flexible back A. But

What I claim as new and desire to secure by Letters Patent, is.

Constructing the curry comb with a flexible back A, formed of india rubber and flexible teeth (*a*) formed of the same material as the back or other pliable or flexible substance which may be molded with the india rubber substantially as shown and described.

E. L. EVANS.

Witnesses:
ALBERT M. HEWITT,
HENRY MARTIN.